Figure 1:
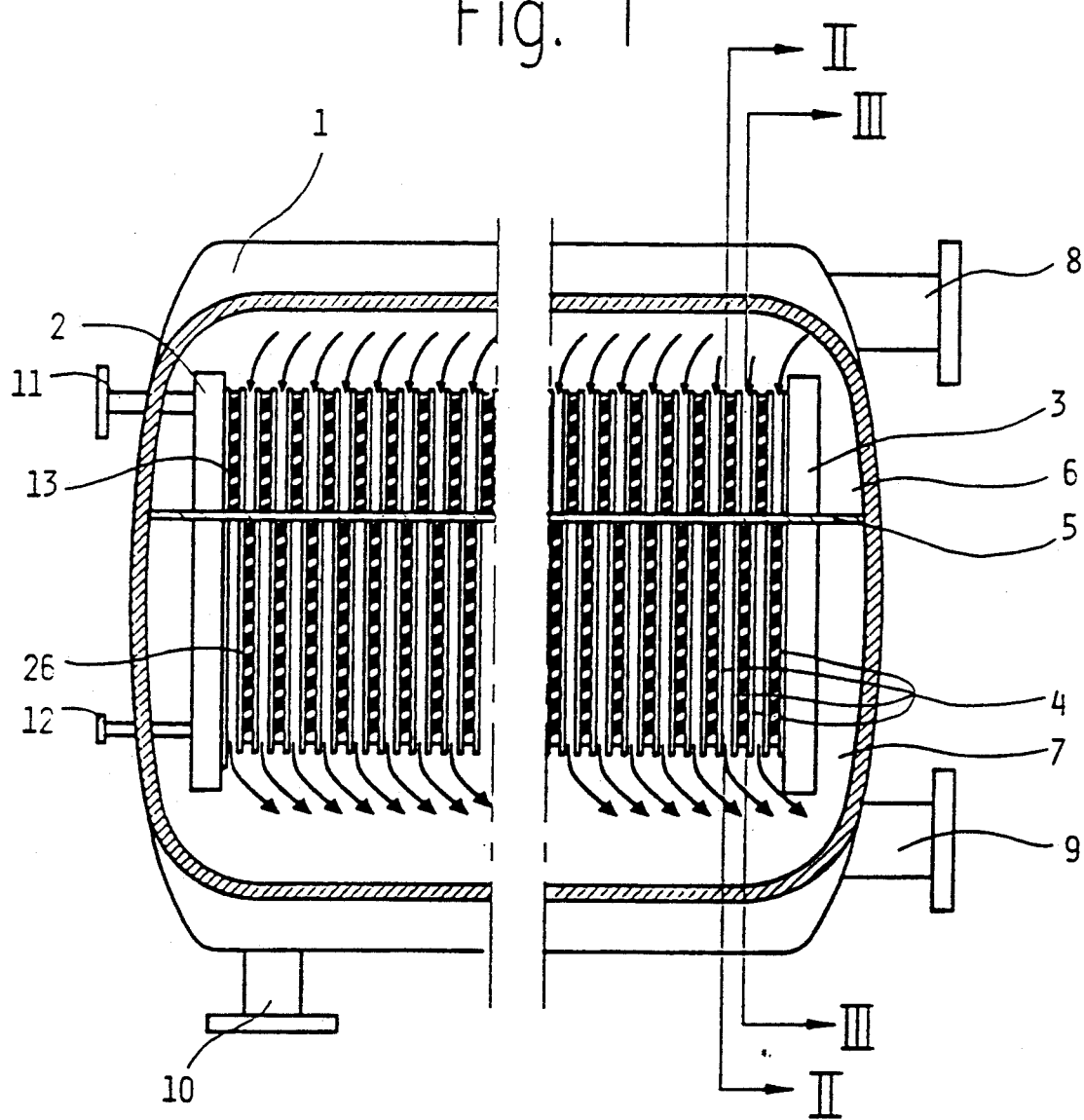

United States Patent [19]

Kontu et al.

[11] Patent Number: 5,232,557
[45] Date of Patent: Aug. 3, 1993

[54] HEAT TRANSFER PLATES EVAPORATION AND CONDENSATION APPARATUS

[75] Inventors: Mauri Kontu, Kalanti, Finland; Mogens Heine, Glostrup; Niels-Erik Clausen, Stenlöse, both of Denmark; Ralf Blomgren, Skanör, Sweden

[73] Assignee: Alfa-Laval Desalt A/S, Hvidovre, Denmark

[21] Appl. No.: 854,656

[22] PCT Filed: Oct. 18, 1990

[86] PCT No.: PCT/SE90/00667
§ 371 Date: May 1, 1992
§ 102(e) Date: May 1, 1992

[87] PCT Pub. No.: WO91/06817
PCT Pub. Date: May 16, 1991

[30] Foreign Application Priority Data

Nov. 2, 1989 [SE] Sweden ............ 8903671
Nov. 2, 1989 [SE] Sweden ............ 8903672

[51] Int. Cl.$^5$ ............ B01D 1/28; B01D 3/02
[52] U.S. Cl. ............ 202/182; 202/177; 202/202; 202/266; 202/267.1; 202/269; 159/24.1; 159/28.6; 159/DIG. 15; 159/DIG. 31; 159/DIG. 42; 203/11; 203/22; 203/23; 203/26
[58] Field of Search ............ 159/28.6, 24.1, 24.2, 159/DIG. 42, 13.1, DIG. 15, DIG. 31; 202/182, 176, 177, 236, 202, 205, 267.1, 269; 203/26, 22, 23, 10, 11

[56] References Cited

U.S. PATENT DOCUMENTS

| | | | |
|---|---|---|---|
| 3,155,565 | 11/1964 | Goodman | 159/28.6 |
| 3,984,281 | 10/1976 | Buchwald | 159/28.6 |
| 4,640,740 | 2/1987 | Moore et al. | 159/28.6 |
| 4,671,856 | 6/1987 | Sears | 159/28.6 |
| 4,673,459 | 6/1987 | Elmore et al. | 159/28.6 |
| 4,808,262 | 2/1989 | Aneja et al. | 159/28.6 |

FOREIGN PATENT DOCUMENTS

| | | |
|---|---|---|
| 1299481 | 12/1972 | United Kingdom . |
| 1412414 | 11/1975 | United Kingdom . |
| 1421915 | 1/1976 | United Kingdom . |
| 1425176 | 2/1976 | United Kingdom . |

*Primary Examiner*—Wilbur Bascomb, Jr.
*Attorney, Agent, or Firm*—Davis Hoxie Faithfull & Hapgood

[57] ABSTRACT

In a plate heat exchanger for evaporation of a liquid by means of a heat emitting vapor every second plate interspace forms an evaporation passage (28) and the rest of the plate interspaces form condensation passages (30). Aligned openings (16) in the plates form an inlet channel through the plate heat exchanger for introduction of evaporation liquid into the evaporation passages (28). For enabling use of a large inlet area of each condensation passage (30) and a large outlet area of each evaporation passage (28) the plate heat exchanger is arranged in a container (1), the interior of which is divided in two chambers (6, 7) by the plate heat exchanger itself and a partition (5). Sealing means (13, 26) are arranged in the plate interspaces in a way such that the evaporation passages are closed from one chamber (6) but communicate with the other chamber (7) along the edges of the plates, whereas the condensation passages (30) communicate with said one chamber (6) along the edges of the plates but are closed from the other chamber (7).

14 Claims, 3 Drawing Sheets

HEAT TRANSFER PLATES EVAPORATION AND CONDENSATION APPARATUS

The present invention concerns an apparatus for at least partial evaporation of a liquid by means of a heat emitting vapour which is brought into indirect contact with the liquid and which, thereby, is at least partly condensed, said apparatus comprising a package of heat transfer plates which between themselves define plate interspaces and, together with sealing means extending along the edges of the heat transfer plates, form an evaporation passage in every second plate interspace and condensation passages in the rest of the plate interspaces, the heat transferring plates further having through openings forming an inlet channel through the plate package for the supply of liquid into the evaporation passages.

In GB 1.299.481 there is shown an apparatus of this kind in which heat emitting vapour as well as vapour generated within the apparatus are conducted to the condensation passages and from the evaporation passages, respectively, through channels extending through the plate package and formed by aligned openings in the heat transfer plates.

Transportation of heat emitting and generated vapour, respectively, in this manner through channels extending through the package of heat transfer plates has several disadvantages. One is that the openings in the heat transfer plates have to be made very large for avoiding unnecessary pressure drops of the transported vapours, which means that much plate material has to be removed from the heat transfer plates. Another disadvantage is that the area of the vapour inlet to every condensation passage, as well as the area of the vapour outlet from each evaporation passage, becomes relatively small, which creates undesired pressure drops of the vapours. A third disadvantage is that the pressure conditions at the vapour inlets to the various condensation passages and at the vapour outlets from the various evaporation passages will be different along said channels in the plate package, which results in different temperatures prevailing in the various condensation passages and in the various evaporation passages. This means that the heat transfer will not be of the same efficiency in all parts of the plate package.

The object of the present invention is to provide an apparatus of the initially defined kind which is free of the above mentioned disadvantages connected with an apparatus according to GB 1.299.481 and which can be made more effective than this.

This object may be obtained in an apparatus of the initially defined kind, which is characterized in that the package of heat transfer plates is arranged in a container, that a partition means divides the interior of the container in two separate chambers in a way such that each heat transfer plate has one part of its surrounding edge situated in one of the chambers and another part, preferably the rest, of its surrounding edge situated in the other chamber, that the sealing means between the heat transfer plates are formed such that the evaporation passages are closed from communication with one of the chambers but communicate with the other chamber along the edges of the heat transferring plates, whereas the condensation passages communicate with said one chamber along the edges of the heat transfer plates but are closed from the other chamber, and that said one chamber has an inlet for heat emitting vapour and the other chamber has an outlet for vapour generated from said liquid.

Firstly, it is made possible by the invention that the inlets of the condensation passages are made very large and, thereby, that a relatively low flow velocity of the heat emitting vapour may be maintained in these inlets. This means that the vapour is subjected to a relatively small pressure drop and, thus, a relatively small undesired temperature drop caused thereby in connection with its entering the condensation passages.

Secondly, it is made possible by the invention that the outlets of the evaporation passages are made very large and, thereby, that a relatively small flow resistance arises for the generated vapour in these outlets. This means that a relatively low vapour pressure—and thus a relatively low evaporation temperature—may be maintained in the evaporation passages.

Consequently, there have been created conditions by the invention for maintaining the largest possible temperature difference in the plate heat exchanger between the heat emitting vapour and the generated vapour at predetermined vapour pressures in the two different chambers of the above mentioned container.

This means that an apparatus designed according to the invention will be very effective in operation. Advantageously, therefore, it may be used in processes in which the vapour generated in the apparatus, or part of this vapour, is to be used again in the apparatus after compression as heat emitting vapour. One example of a process like this is production of fresh water from for instance sea water, the sea water being evaporated and the vapour generated being condensed to fresh water in one and the same heat exchanger. Upon use of an apparatus designed according to the invention the generated vapour need be compressed only insignificantly, for instance from a pressure of 0.15 bars to a pressure of 0.19 bars, in order to be used as a heat emitting vapour. Such a compression may be accomplished by means of a conventional high pressure fan.

An apparatus designed according to the invention may be used both in connection with falling film evaporation and rising film evaporation. In both cases it is suitable that the heat transfer plates are arranged substantially vertically, that the partition means extends substantially horizontally and seals against the edges of the heat transfer plates at a certain level in the container, and that the evaporation passages and the condensation passages have their inlets and outlets for the respective heat exchange media situated so that the evaporation liquid and the condensation vapour will be conducted concurrently through the respective plate interspaces at said level in the container.

In an apparatus according to the invention designed as a rising film evaporator the heat transfer plates at their upper parts may have through holes forming one or more outlet channels through the plate package for uncondensed portions of the heat emitting vapour. Condensate can be allowed to run downwardly and out into the said container. As an alternative to such outlet channels through the plate package the heat emitting vapour, through guiding ribs or the like, may be conducted in any suitable way through the condensation passages and out said passages at the lower portions thereof to the lower chamber in the container. This lower chamber then has to be divided in one inlet compartment for heat emitting vapour and one outlet compartment for uncondensed portions of the heat emitting vapour.

If the apparatus is to be used for falling film evaporation the inlet channel for evaporation liquid preferably extends through the upper part of the plate package, the heat transfer plates in their lower parts having through holes forming one or more outlet channels through the plate package for conducting condensate out of the condensation passages.

Even in this case the chamber in the container, which communicates with the condensation passages of the plate heat exchanger, may be divided in one inlet compartment and one outlet compartment.

Conventional heat transfer plates advantageously used in an apparatus according to the invention are often elongated. A package of such heat transfer plates may be arranged in said container, if so desired, with the long sides of the plates extending horizontally. However, a preferred embodiment in the apparatus according to the invention is characterized in that elongated heat transfer plates are arranged with their long sides vertically, that the partition means extends across the planes of the plates and seals against the two long sides of the plates, and that the sealing means between the heat transfer plates leave slots between adjacent heat transfer plates along their long sides, so that both the connection between the condensation passages and said one chamber and the connection between the evaporation passages and said other chamber are obtained, as to substantial parts thereof, along each of the long sides of the heat transfer plates.

For obtainment of the largest possible inlets to the condensation passages and the largest possible outlets from the evaporation passages, the sealing means between the heat transfer plates should leave slots even between the respective short sides of adjacent heat transfer plates.

Figure 2:
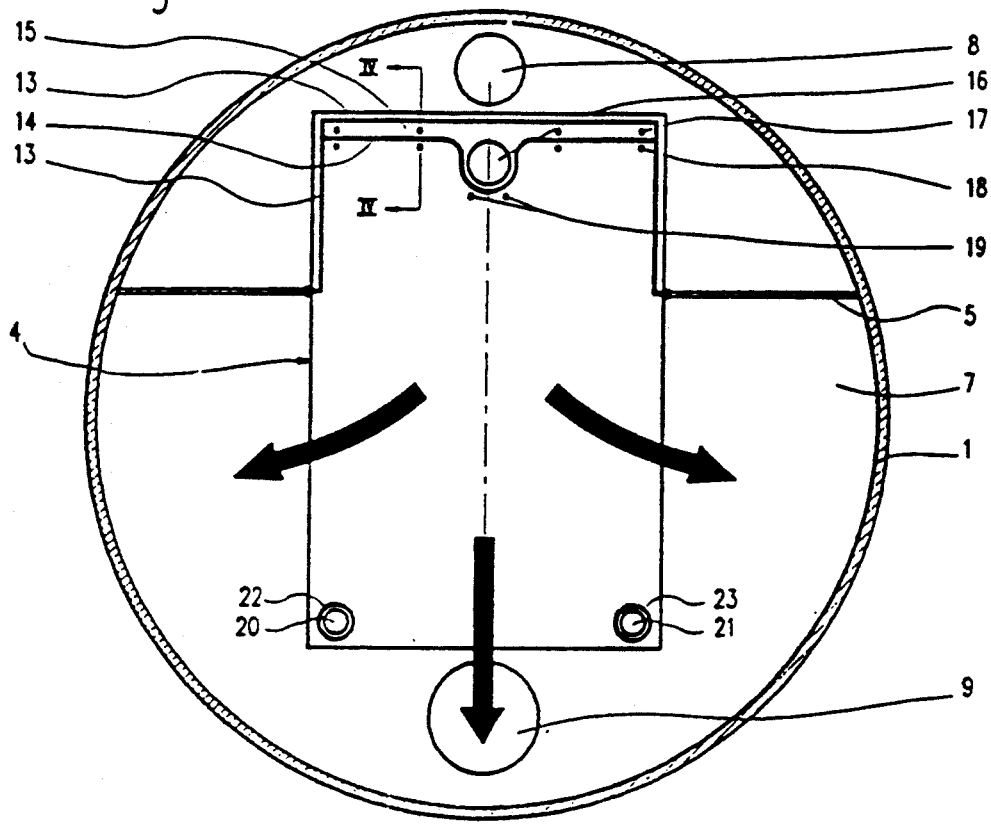
Figure 3:
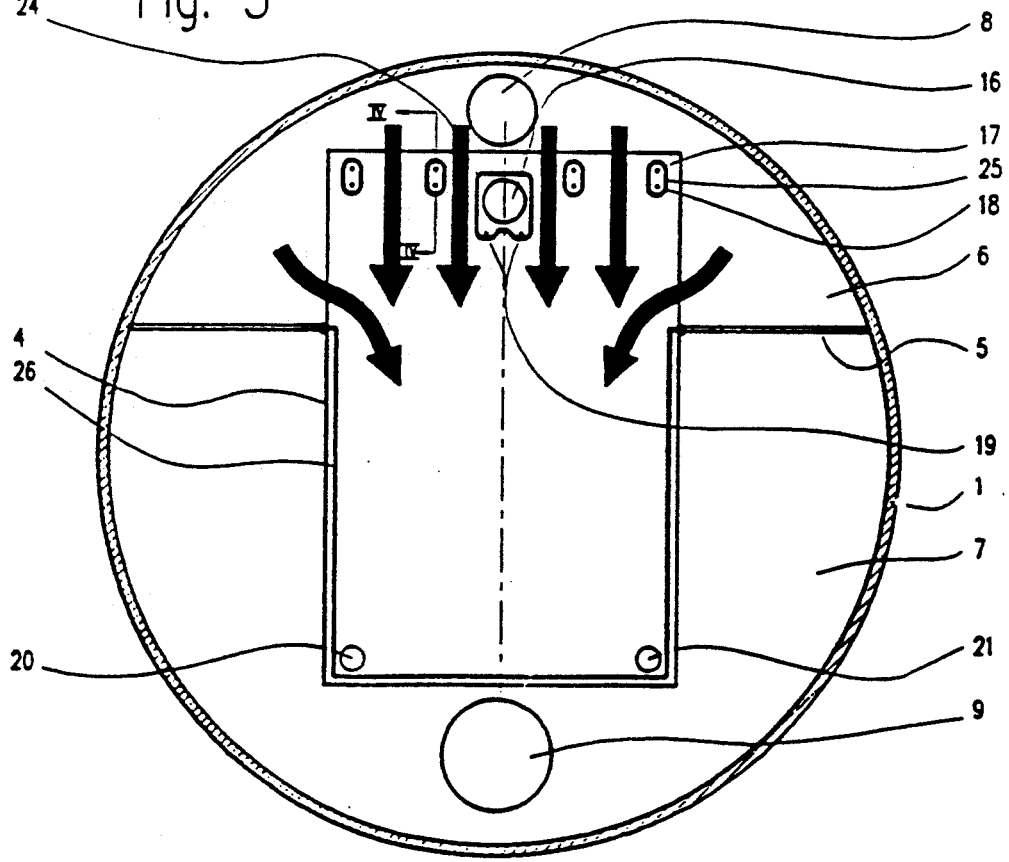
Figure 4:
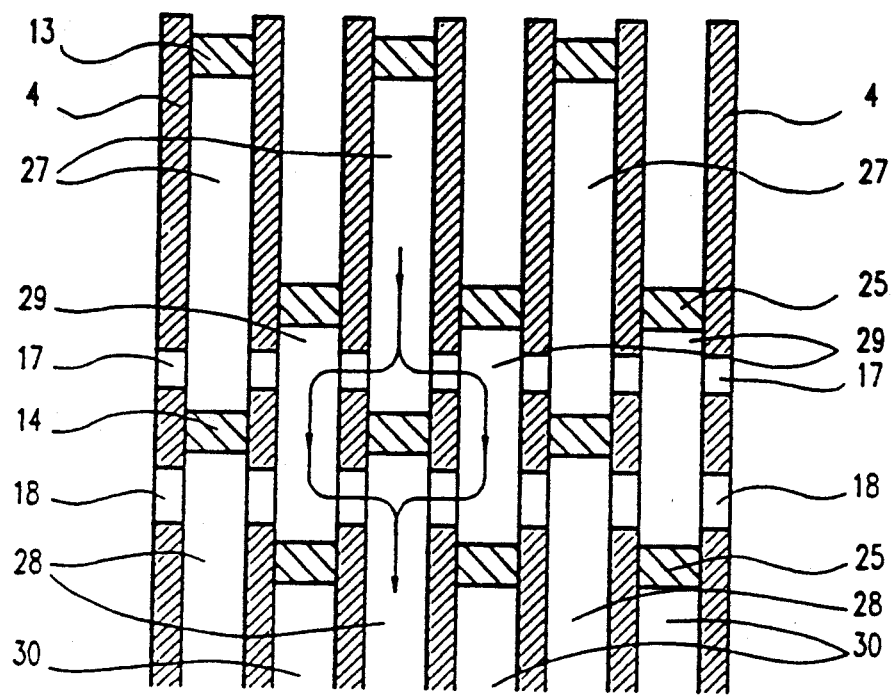
Figure 5:
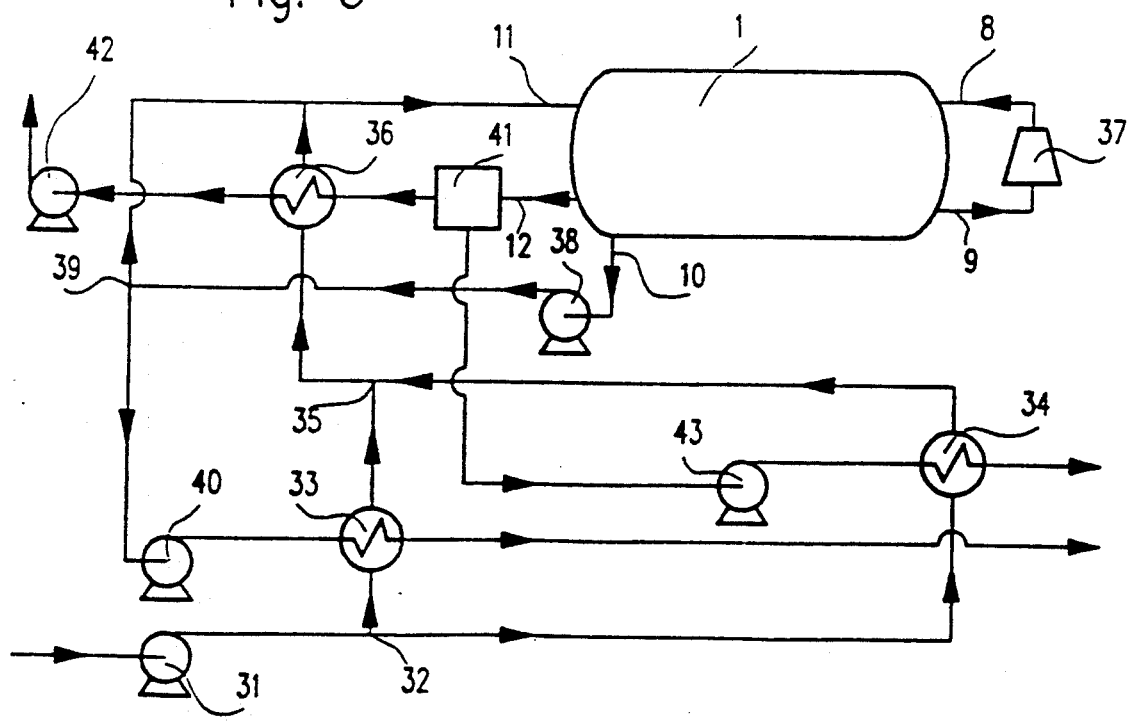

The invention is described below with reference to the accompanying drawing, in which FIG. 1 shows a container and a plate heat exchanger arranged therein, FIG. 2 shows a cross-sectional view along the line II—II in FIG. 1, FIG. 3 shows a cross-sectional view along the line III—III in FIG. 1, FIG. 4 shows a section through the upper part of a plate heat exchanger according to FIG. 1, which section is taken along a line IV—IV in FIG. 2 and a corresponding line IV—IV in FIG. 3, and FIG. 5 shows a flow diagram of a plant for production of fresh water from sea water.

FIG. 1 shows a closed container 1 in the form of a cylindrical pressure vessel provided with end walls and a plate heat exchanger arranged within the container. The plate heat exchanger comprises two end plates 2 and 3 and a package of heat transfer plates 4 which are clamped conventionally between the end plates. The end plates 2, 3 as well as the heat transfer plates 4 are carried within the container by a frame which is not shown in the drawing, so that they extend vertically. Spacing members, preferably pressed in the heat transfer plates in a conventional manner, keep the heat transfer plates at a distance from each other, so that plate interspaces to be traversed by heat exchange fluids are formed.

A horizontal partition 5 extends within the container 1 all the way around the plate heat exchanger, so that it divides the interior of the container into an upper chamber 6 and a lower chamber 7. The upper chamber 6 has an inlet 8 for heat emitting vapour and the lower chamber 7 has an outlet 9 for vapour having been generated in the plate heat exchanger. At its bottom the container 1 has a further outlet 10 from the lower chamber 7, which is intended for liquid having been supplied to but not evaporated in the plate heat exchanger.

Through one end wall of the container there extend one pipe 11 and two pipes 12, said pipe 11 forming an inlet to the plate heat exchanger for liquid to be evaporated therein, and the pipes 12 forming outlets for condensate formed in the plate heat exchanger.

Between the heat transfer plates 4 there are arranged sealing members of different kinds. These are described below with reference to FIGS. 2 and 3.

FIG. 2 shows one side of a heat transfer plate 4. As can be seen the heat transfer plate has an elongated rectangular form and is arranged in the container 1 such that its long sides or edges extend vertically and its short sides or edges extend horizontally. The partition 5 extends at a certain level in the container 1 from each of the long sides of the heat transferring plates 4 horizontally towards the surrounding wall of the container 1.

On its side shown in FIG. 2 the heat transferring plate 4 has a first gasket 13 extending along the edge of the heat transfer plate upwardly from the level of the partition 5 at one long side of the plate, then along the upper short side of the plate and back downwardly along the other long side of the plate to the level of the partition 5. As can be seen from FIG. 2, the gasket 13 extends at the long sides of the heat transfer plate horizontally up to the respective parts of the partition 5.

A second gasket 14 extends in parallel with the upper short side of the heat transfer plate between the vertical portions of the gasket 13, so that an area 15 of the upper part of the heat transfer plate is completely surrounded by the gaskets 13 and 14. When the gaskets 13 and 14 abut against the plate shown in FIG. 2 as well as an adjacent plate in the plate heat exchanger, a closed so called distribution chamber will be formed in the plate interspace in the area 15, which extends across the whole width of the heat transfer plates.

In the area 15 the heat transfer plate 4—like all of the heat transfer plates in the plate heat exchanger—has a through opening 16. All of the openings 16 form an inlet channel through the package of heat transfer plates 4, communicating both with the previously mentioned inlet 11 (FIG. 1) for liquid to be evaporated and with each of said distribution chambers.

In addition to the opening 16 each heat transfer plate has in the area 15 and close to the gasket 14 four smaller holes 17 distributed across the width of the plate. Vertically below each of the holes 17 on the opposite side of the gasket 14 there is a further small through hole 18. Finally, close to the large opening 16 but below the gasket 14 there are two small through holes 19.

Each heat transfer plate in its lower corner has two through holes 20 and 21, which on the plate side shown in FIG. 2 are surrounded by two annular gaskets 22 and 23, respectively. The holes 20 and 21 in the heat transfer plates form two channels through the plate package, which communicate with the outlets 12 of the plate heat exchanger for liquid having been condensed but which are closed by the gaskets 22 and 23, respectively, from connection with the plate interspaces in which these gaskets are arranged.

FIG. 3 shows one side of a heat transfer plate 4 which is intended to be placed behind a heat transfer plate according to FIG. 2. As can be seen, even the plate in FIG. 3 has in its upper part a relatively large opening 16 and substantially smaller holes 17, 18 and 19. Also, the plate in FIG. 3 has through holes 20 and 21 at its lower corners. In these respects the plates in FIG. 2 and FIG. 3 are thus alike. The plate according to FIG. 3, however, has a different arrangement of gaskets than the plate according to FIG. 2.

In the upper part of the plate in FIG. 3 the opening 16 and the two small holes 19 are surrounded by a first gasket 24. Furthermore, there are in the upper part of the plate four horizontally spaced gaskets 25. Each of these surrounds a small area of the plate, in which there are both one hole 17 and one hole 18.

In the lower part of the plate in FIG. 3 a gasket 26 extends along the edge of the plate downwardly from the level of the partition 5 at one long side or edge of the plate, then along the lower short side or edge of the plate and again upwardly along the other long side of the plate to the level of the partition 5. As can be seen, the gasket 26 extends at the level of the partition 5 horizontally up to the respective portions of the partition 5. The holes 20 and 21 at the lower corners of the plate are placed inside, i.e. above, the gasket 26.

FIG. 4 shows a section through the upper parts of a number of heat transfer plates, which section is taken along the line IV—IV in FIG. 2 and along a corresponding line IV—IV in FIG. 3.

In every second plate interspace there is shown in FIG. 4 a section through the upper part of a gasket 13 (FIG. 2) and a section through a gasket 14 (FIG. 2). Between the gaskets 13 and 14 there is formed in each such plate interspace a distribution chamber 27 which extends across the whole width of the heat transfer plates 4. The distribution chamber 27 communicates with the channel through the plate package, which is formed by the openings 16 in the plates.

Below the gasket 14 there is formed in each of these plate interspaces an evaporation space 28 in which liquid is to be evaporated. Each evaporation space 28 is closed from connection with the upper chamber 6 in the container 1 by the vertical parts of the gasket 13 (FIG. 2) but communicates with the lower chamber 7 in the container 1 through the slots between the edges of the heat transferring plates—along the lower parts of the plate long sides as well as along the lower short sides of the plates. This is illustrated by means of arrows in FIG. 2.

In each of the rest of the plate interspaces there is shown in FIG. 4 a section through a gasket 25 (FIG. 3), which together with the two heat transferring plates against which it seals forms a transferring chamber 29. Outside the gasket 25 there is formed in the interspace between the two heat transferring plates a condensation space 30. The condensation space 30 communicates with the upper chamber 6 in the container 1 through the slots between the two heat transferring plates along the upper short sides thereof as well as along the upper parts of their long sides. This is illustrated by means of arrows in FIG. 3. Vapour in the chamber 6 thus may flow into each condensation space 30 both from the two sides of the plate package and from above through the interspaces between adjacent gaskets 25.

Each condensation space 30 is closed by the gasket 26 (FIG. 3) from connection with the lower chamber 7 in the container 1.

All of the plate interspaces forming condensation spaces 30, as well as the upper chamber 6 in the container 1, are closed by the gaskets 24 (FIG. 3) from connection with the channel through the plate package, which is formed by the openings 16 in the heat transferring plates.

As illustrated by arrows in FIG. 4, each distribution chamber 27 communicates through opposing holes 17 in two adjacent heat transferring plates with two transferring chambers 29. Through opposing holes 18 in the same heat transferring plates the two said transferring chambers 29 communicate with the evaporation space 28 that is formed between the two heat transferring plates. The holes 18 have somewhat larger throughflow area than the holes 17.

The apparatus according to FIGS. 1-4 is intended to operate in the following manner.

Liquid to be evaporated is pumped in a preheated condition through the inlet pipe 11 (FIG. 1) into the channel through the package of heat transferring plates, formed by the openings 16 in the plates. From this channel the liquid flows further out into the different distribution chambers 27 (FIG. 4), which extend across the whole width of the heat transfer plates (see the area 15 in FIG. 2). From the distribution chambers 27 the liquid flows through the holes 17 in the plates into the various transferring chambers 29 and then through the holes 18 out into the evaporation spaces 28. Simultaneously, liquid flows into the evaporation spaces 28 directly through the holes 19 from the plate interspaces in which the gaskets 24 (FIG. 3) surround the openings 16 and the holes 19. In the evaporation spaces 28 the liquid then runs downwardly in thin layers along the heat transfer plates, covering the opposing surfaces thereof.

Simultaneously there is supplied to the upper chamber 6 in the container 1 through the inlet 8 a heat emitting vapour which flows into the condensation spaces 30 through the slots between the edges of the heat transferring plates, as illustrated in FIG. 3. The heat emitting vapour condenses in the condensation spaces 30 upon its contact with the heat transferring plates to which it thus emits heat. This heat causes evaporation of the liquid running downwardly along the opposite sides of the plates in the evaporation spaces 28. Vapour formed in the evaporation spaces 28 leaves and flows out into the lower chamber 7 of the container 1 both sidewise and downwardly, as illustrated by means of arrows in FIG. 2. The generated vapour leaves the chamber 7 through the outlet 9, whereas unevaporated liquid is collected at the bottom of the container and is discharged—continuously or intermittently—through the bottom outlet 10 (FIG. 1).

Condensate formed by the heat emitting vapour in the condensation spaces 30 runs downwardly along the heat transfer plates and leaves the condensation spaces through the two channels formed by the holes 20 and 21 in the lower parts of the heat transfer plates. These channels are closed from communication with the evaporation spaces 28 by the gaskets 22 and 23 (FIG. 2). Even uncondensed parts of the heat emitting vapour leave the condensation spaces 30 through said channels and are discharged together with the condensate through the outlets 12 (FIG. 1).

As mentioned previously, the holes 18 are somewhat larger than the holes 17. The hole sizes are chosen such that during the operation of the apparatus a partial evaporation of evaporation liquid is obtained when the liquid passes through the holes 17. The holes 18 are made large enough so that the vapour pressure that will prevail in the transferring chambers 29 shall not exceed the vapour pressure prevailing in the heat emitting vapour in the condensation spaces 30. The purpose thereof is to guarantee that upon possible leakage past the gaskets 25 such leakage shall be directed into the transferring chambers 29 and not out of these chambers. Particularly if the apparatus according to the invention is used for the production of fresh water from for instance sea water, it is better if vapour flows into the sea water than if sea water flows into the fresh water.

In the embodiment of the heat transfer plates 4 shown in FIG. 2 and 3 each plate has holes 17-19 on both sides (both to the left and to the right) of the opening 16. If desired, the holes 17-19 may be excluded in every second plate on one side of the opening 16 and in the rest of the plates on the other side of their openings 16. Alternatively, the holes 17 may be excluded in every second plate on one side of the opening 16, and the holes 18 and 19 may be excluded on the other side of the opening 16, whereas in each of the rest of the plates the holes 17 may be excluded on said other side and the holes 18 and 19 be excluded on said one side of the opening 16. Even in these cases liquid will be distributed across the whole width of the plates in each of the evaporation spaces 28.

It has been assumed above that the sealing members arranged between the heat transfer plates are constituted by elastic rubber or plastic gaskets of the kind usually used in connection with heat transfer plates of thin pressed metal sheet. Of course, any other suitable kinds of sealing members may be used. As sealing means could also be chosen permanent interconnection of the heat transfer plates along the lines which in FIG. 2 and 3 show how different gaskets extend. The heat transfer plates may be pressed in a way such that they abut against each other along these lines in the respective plate interspaces, so that sealing between—possibly interconnection of—the plates is facilitated.

Thanks to the design of the above described apparatus the smallest possible pressure drop is obtained for the working vapours at their entering into and discharge from, respectively, the plate heat exchanger. This makes the apparatus effective and inexpensive in operation.

FIG. 5 shows a flow diagram of a plant in which the described apparatus is included. The plant is intended for the production of fresh water from sea water. Thus, FIG. 5 shows the container 1 with its inlet 8 for heat emitting vapour, its inlet 11 for liquid to be evaporated, i.e. sea water, its outlet 9 for generated vapour, its outlet 10 for concentrated liquid, i.e. sea water having not been evaporated, so called brine, and its outlet 12 for condensate, i.e. fresh water, and uncondensed parts of the heat emitting vapour.

Sea water is pumped by means of a pump 31 into the plant. After the pump 31 the sea water is divided at 32 in two branch streams. One passes through a heat exchanger 33 and the other through a heat exchanger 34. The branch streams are then united at 35 and are pumped further through another heat exchanger 36 to the inlet 11 of the container 1. The generated vapour leaving the container through the outlet 9 is transferred through a compressor 37 to the inlet 8 for heat emitting vapour. A conventional high pressure fan may serve as a compressor.

So called brine, i.e. sea water having not been evaporated in the container 1, is pumped by means of a pump 38 out of the container 1 through its bottom outlet 10 and is divided at 39 in two branch streams. One branch stream is returned to the container inlet 11 for liquid to be evaporated, whereas the other branch stream is pumped by means of a pump 40 through the heat exchanger 33 and out of the plant. In the heat exchanger 33 this branch stream emits part of its heat to one of the branch streams of incoming sea water.

A mixture of fresh water, i.e. condensate from the heat emitting vapour supplied through the inlet 8, and non-condensed residuals of this vapour are removed from the container 1 through the outlet 12. In a separator 41 the gasous parts of the mixture are separated, and by means of a vacuum pump 42 they are sucked through the heat exchanger 36 and out of the plant. In the heat exchanger 36 they emit part of their heat to the already partly preheated incoming sea water.

The fresh water is pumped from the separator 41 by means of a pump 43 through the heat exchanger 34 and out of the plant. In the heat exchanger 34 the fresh water emits part of its heat to a branch flow of the incoming sea water.

In the described plant the incoming sea water preferably is preheated almost to a temperature corresponding to its boiling point at the evaporation pressure prevailing in the evaporation spaces of the plate heat exchanger. For instance, the sea water may be preheated so that it has a temperature of 55° C. in the container inlet 11. The generated vapour in the container outlet 9 may have a temperature only insignificantly exceeding 55° C. and a pressure of for instance 0.15 bars. The vapour may after that be compressed to having in the container inlet 8 and in the chamber 6 a pressure of about 0.19 bars and a temperature of about 59° C.

With reference to FIG. 5 there has been described above a vacuum pump 42 arranged to maintain a desired vacuum level in the container 1. If desired a vacuum pump for the same purpose may alternatively or additionally be connected to the upper compartment 6 in the container 1.

We claim:
1. An apparatus for at least partial evaporation of a liquid by means of a heat emitting vapour which is brought into indirect contact with the liquid and which is thereby at least partly condensed, said apparatus comprising a package of heat transfer plates (4) which define plate interspaces between themselves and together with sealing means (13, 26) extending along the edges of the heat transfer plates, form an evaporation passage (28) in every second plate interspace and condensation passages (30) in the rest of the plate interspaces, the heat transfer plates (4) further having through openings (16) forming an inlet channel through the plate package for the supply of liquid into the evaporation passages (28), characterized in that the package of heat transfer plates (4) is arranged in a container (1), a partition means (5) divides the interior of the container (1) into two separate chambers (6,7) in a way such that each heat transfer plate (4) has one part of its surrounding edge situated in one chamber (6) and another part of its surrounding edge situated in the other chamber (7), the sealing means (13,26) between the heat transfer plates (4) are so formed that the evaporation passages are closed from connection with one chamber but communicate with the other chamber (7) along the edges of the heat transfer plates, while the condensation passages (30) communicate with said one chamber (6) along the edges of the heat transfer plates but are closed from the other chamber (7), and said one chamber (6) has an inlet (8) for heat emitting vapour and the other chamber (7) has an outlet (9) for vapour generated from said liquid.

2. An apparatus according to claim 1, characterized in that each heat transfer plate (4) has parts of its surrounding edge situated in one chamber (6) and substantially the rest of its surrounding edge situated in the other chamber (7).

3. An apparatus according to claim 1, characterized in that the heat transfer plates (4) are arranged substantially vertically, that the partition means (5) extends substantially horizontally and seals against the edges of the heat transfer plates (4) at a certain level in the container (1), and that the evaporation passages (28) and the condensation passages (30) have inlets and outlets situated so that the liquid to be evaporated and condensate from said heat emitting vapour will be conducted concurrently through their respective plate interspaces at said level in the container (1).

4. An apparatus according to claim 1, characterized in that the heat transfer plates (4) are arranged substantially vertically, that the inlet channel for liquid extends through the upper part of the plate package and that the heat transfer plates (4) in their lower parts have through-holes (20, 21) forming at least one outlet channel through the plate package for conducting condensate out from the condensation passages (30).

5. An apparatus according to claim 1, characterized in that the heat transfer plates (4) have lengths greater than their widths, providing two long edges and two short edges and are arranged with their long edges substantially vertical, that the partition means (5) extends across the plates of the plates and seals against both the long edges of the plates, and that the sealing means (13, 26) between the heat transfer plates leave slots between adjacent heat transfer plates along their long edges, so that both the connection between the condensation passages (30) and said one chamber (6) and the connection between the evaporation passages (28) and said other chamber (7) are obtained to substantial parts along each of the long edges of the heat transfer plates.

6. An apparatus according to claim 5, characterized in that the sealing means (13, 26) between the heat transfer plates (4) leave slots between adjacent heat transfer plates even at their short edges, so that the connection between the condensation passages (30) and said first chamber (6) and the connection between the evaporation passages (28) and the other chamber (7) are obtained along both said long edges and said short edges.

7. An apparatus according to claim 1, characterized in that said one chamber (6) communicates with the condensation passages (30) along substantially the whole of the part of each heat transfer plate (4) that is situated in this chamber (6), whereas the other chamber (7) communicates with the evaporation passages (28) along substantially the rest of the periphery of each heat transfer plate (4).

8. An apparatus according to claim 1, and comprising means for clamping the heat transfer plates (4) releasably in said package.

9. An apparatus according to claim 8, characterized in that said sealing means (13, 26) are constituted by elastic gaskets.

10. An apparatus according to claim 1, characterized in that the inlet (8) of said one chamber (6) for heat emitting vapour communicates with the outlet (9) of the other chamber (7) for generated vapour, said apparatus further comprising means for transferring generated vapour from said outlet (9) to said inlet (8) under compression, so that a larger vapour pressure is maintained in said one chamber (6) than in the other chamber (7).

11. An apparatus according to claim 1, characterized in that
the heat transfer plates (4) are arranged substantially vertically,
sealing means (13,14) define distribution chambers (27) in the upper parts of those plate interspaces forming evaporation passages (28), each of said distribution chambers (27) communicating with said inlet channel formed by the openings (16) and having several separate connections with at least one evaporation passage (28),
at least two sealing means (25) are arranged in the upper part of each plate interspace forming a condensation passage (30), horizontally spaced from each other along the heat transfer plates (4), each of said sealing means defining between the heat transfer plates (4) a transferring chamber (29) that is closed from connection with other parts of the condensation passage (30),
each condensation passage (30) communicates with said one chamber (6) through gaps formed between said sealing means (25) for receiving heat emitting vapour from above, and
the heat transfer plates (4) have through holes (17, 18) communicating with the transferring chambers, each transferring chamber (29) communicating through at least one first hole (17) with a distribution chamber (27) and through at least one second hole (18) with an evaporation passage (28).

12. An apparatus according to claim 11, characterized in that at least every second heat transfer plate (4) has through holes (17, 18) arranged in pairs, one hole (17) of a pair of holes connecting a transferring chamber (29) with a distribution chamber (27) and the other hole (18) connecting the same transferring chamber (29) with an evaporation passage (28).

13. An apparatus according to claim 11, characterized in that each heat transfer plate (4) has vertical and horizontal edge portions, that each of the distribution chambers (27) extends horizontally between the vertical edge portions of the heat transfer plates and that said inlet channel for the liquid to be evaporated extends through the plate package substantially in the middle between said vertical edge portions.

14. An apparatus according to claim 12, characterized in that said one hole (17) is smaller than said other hole (18).

* * * * *

UNITED STATES PATENT AND TRADEMARK OFFICE
CERTIFICATE OF CORRECTION

PATENT NO. : 5,232,557
DATED : August 3, 1993
INVENTOR(S) : Kontu, et al

It is certified that error appears in the above-indentified patent and that said Letters Patent is hereby corrected as shown below:

| | |
|---|---|
| Col. 3, line 17 | cancel "in" and substitute --of--. |
| Col. 4, line 22 | cancel "transferring" and substitute --transfer--. |
| Col. 5, line 49 | cancel "transferring" and substitute --transfer--. |
| Col. 5, line 52 | cancel "transferring" and substitute --transfer--. |
| Col. 5, line 55 | cancel "transferring" and substitute --transfer--. |
| Col. 6, lines 1 & 2, | cancel "transferring" and substitute --transfer--. |
| Col. 6, line 5 | cancel "transferring" and substitute --transfer--. |
| Col. 6, line 7 | cancel "transferring" and substitute --transfer--. |
| Col. 6, line 9 | cancel "transferring" and substitute --transfer--. |
| Col. 6, line 16 | cancel "transferring" and substitute --transfer--. |

UNITED STATES PATENT AND TRADEMARK OFFICE
CERTIFICATE OF CORRECTION

PATENT NO. : 5,232,557
DATED     : August 3, 1993
INVENTOR(S) : Kontu, et al

It is certified that error appears in the above-indentified patent and that said Letters Patent is hereby corrected as shown below:

Col. 6, lines 34 & 35    cancel "transferring" and substitute --transfer--.

Col. 6, line 37          cancel "transferring" and substitute --transfer--.

Signed and Sealed this

Sixteenth Day of August, 1994

Attest:

BRUCE LEHMAN

Attesting Officer    Commissioner of Patents and Trademarks